United States Patent
Ramos et al.

(10) Patent No.: US 9,400,227 B2
(45) Date of Patent: Jul. 26, 2016

(54) METHOD AND SYSTEM FOR DETECTION OF FLUID INVASION IN AN ANNULAR SPACE OF FLEXIBLE PIPE

(75) Inventors: Rogerio Tadeu Ramos, Hampshire (GB); Stephen Kimminau, Maidenhead (GB)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 13/262,234

(22) PCT Filed: Apr. 9, 2010

(86) PCT No.: PCT/US2010/030568
§ 371 (c)(1),
(2), (4) Date: Dec. 2, 2011

(87) PCT Pub. No.: WO2010/118342
PCT Pub. Date: Oct. 14, 2010

(65) Prior Publication Data
US 2012/0170610 A1    Jul. 5, 2012

Related U.S. Application Data

(60) Provisional application No. 61/168,179, filed on Apr. 9, 2009.

(51) Int. Cl.
*G01N 25/72* (2006.01)
*G01M 3/00* (2006.01)
*E21B 17/01* (2006.01)

(52) U.S. Cl.
CPC ............. *G01M 3/002* (2013.01); *E21B 17/015* (2013.01)

(58) Field of Classification Search
CPC ......... G01K 1/14; G01K 1/143; G01K 17/06; G01K 13/02; G01N 25/72
USPC ............... 374/4, 5, 10, 141, 101, 102, 45, 57, 374/208, 135, 147, 143, 183; 702/34, 35, 702/36, 51
See application file for complete search history.

(56) References Cited

U.S. PATENT DOCUMENTS 3,570,310 A * 3/1971 Densmore .................. 73/152.33
3,874,222 A * 4/1975 Ladd ........................ G01M 3/18
340/524

(Continued)

FOREIGN PATENT DOCUMENTS

| DE | 10242162 A1 * | 3/2004 |
| JP | 59210340 A * | 11/1984 |

(Continued)

OTHER PUBLICATIONS

Ricardo De Oliveira Carneval, et al., "Flexible Line Inspection," ECNDT 2006—Poster 106, pp. 1-11.

(Continued)

*Primary Examiner* — Gail Kaplan Verbitsky
(74) *Attorney, Agent, or Firm* — Chamberlain Hrdlicka

(57) ABSTRACT

A system and method are provided for detecting fluid invasion of an annular space in a pipe structure. The system includes a thermal element and a temperature sensing element placed in the vicinity of each other in the annular space of the pipe structure. A thermal signal is generated by the thermal element. The temperature sensing element is connected to a monitor that monitors and processes the thermal signal. As the thermal signal changes when conducted through different types of fluids, the invasion of an annular space by seawater that normally contains oil or gas may be reliably detected.

28 Claims, 5 Drawing Sheets

(56) References Cited

U.S. PATENT DOCUMENTS

| | | | | |
|---|---|---|---|---|
| 3,938,544 | A | * | 2/1976 | Bernaerts ............... F16K 5/00 137/334 |
| 4,036,234 | A | * | 7/1977 | Ishizuka .................... 604/378 |
| 4,206,632 | A | * | 6/1980 | Suzuki ..................... 73/40.5 R |
| 4,259,861 | A | * | 4/1981 | Yamamoto et al. ............ 374/4 |
| 4,486,103 | A | * | 12/1984 | Ando .......................... 374/5 |
| 4,500,865 | A | * | 2/1985 | Tanaka et al. ............. 338/13 |
| 4,527,908 | A | * | 7/1985 | Arisi ....................... 374/147 |
| 4,534,662 | A | * | 8/1985 | Barlian ........................ 374/4 |
| 4,750,189 | A | * | 6/1988 | Lancaster et al. ............. 374/4 |
| 4,922,232 | A | * | 5/1990 | Bosich ....................... 340/605 |
| 5,067,094 | A | * | 11/1991 | Hayes ........................ 702/51 |
| 5,228,329 | A | * | 7/1993 | Dennison ................... 73/49.1 |
| 5,297,393 | A | * | 3/1994 | Thompson ................... 62/129 |
| 5,308,162 | A | * | 5/1994 | Amano et al. .............. 374/131 |
| 5,355,720 | A | * | 10/1994 | Bailey .................. G01M 3/165 324/533 |
| 5,450,765 | A | * | 9/1995 | Stover ....................... 73/866.5 |
| 5,505,092 | A | * | 4/1996 | Kowalski ............. G01L 9/0002 338/4 |
| 5,918,641 | A | | 7/1999 | Hardy et al. |
| 5,980,102 | A | * | 11/1999 | Stulen et al. ................. 374/45 |
| 6,217,211 | B1 | * | 4/2001 | Hesky ................... G01M 3/002 340/870.17 |
| 6,540,021 | B1 | * | 4/2003 | Botrel ..................... 166/250.08 |
| 6,834,556 | B2 | * | 12/2004 | Cain et al. ................ 73/861.24 |
| 7,155,961 | B2 | * | 1/2007 | Fernandes et al. ............ 73/49.1 |
| 7,296,480 | B2 | * | 11/2007 | De Aquino ................... 73/847 |
| 7,607,823 | B2 | * | 10/2009 | Kent ............................ 374/4 |
| 7,624,632 | B1 | * | 12/2009 | Hoyle .................. G01M 3/2807 73/204.11 |
| 8,113,709 | B2 | * | 2/2012 | Handa ....................... F17C 7/00 141/82 |
| 8,177,425 | B2 | * | 5/2012 | Grundmann et al. ......... 374/147 |
| 8,360,635 | B2 | * | 1/2013 | Huang et al. ................ 374/147 |
| 2006/0010973 | A1 | * | 1/2006 | Brown ..................... 73/204.11 |
| 2006/0065393 | A1 | * | 3/2006 | Williams et al. .......... 166/250.03 |
| 2006/0108003 | A1 | * | 5/2006 | Bradford et al. ........... 137/487.5 |
| 2008/0163692 | A1 | * | 7/2008 | Huang et al. ................. 73/627 |
| 2013/0080081 | A1 | * | 3/2013 | Dugger .................. G01F 1/667 702/48 |

FOREIGN PATENT DOCUMENTS

| | | | |
|---|---|---|---|
| JP | 04009651 A | * | 1/1992 |
| JP | 2000111691 A | * | 4/2000 |

OTHER PUBLICATIONS

Mauro G. Marinho, et al, "New Techniques for Integrity Management of Flexible Riser-End Fitting Connection," Proceedings of the ASME 27th International Conference on Offshore Mechanics and Arctic Engineering, OMAE 2008, Jun. 15-20, 2008, Estoril, Prtugal, OMAE 2008-57929.

\* cited by examiner

METHOD AND SYSTEM FOR DETECTION OF FLUID INVASION IN AN ANNULAR SPACE OF FLEXIBLE PIPE

RELATED APPLICATIONS

This application claims the priority of U.S. Provisional Application No. 61/168,179 filed Apr. 9, 2009, entitled "Method And System For Detection Of Fluid Invasion In An Annular Space Of Flexible Pipe" and is a continuation-in-part of International Application No. PCT/US2009/031993, entitled "System and Method for In-Line Composition And Volumetric Analysis of Vent Gases And Flooding Of the Annular Space Of Flexible Pipe" filed on Jan. 26, 2009, which claims benefit of priority of U.S. Provisional Application No. 61/023,738 filed on Jan. 25, 2008 entitled "In-Line Composition And Volumetric Analysis of Vent Gases Of the Annular Space Of Flexible Pipe" and the benefit of priority of U.S. Provisional Application No. 61/099,585 filed on Sep. 24, 2008, entitled "Real Time Detection of Water Presence in a Flexible Riser Annulus" the entire contents of all of which are hereby incorporated by references herein.

BACKGROUND OF THE INVENTION

1. Field of the Invention

The invention generally relates to methods and systems for detecting leaks in pipe structures, and more particularly to a system and method for detection of fluid invasion in an annular space of a flexible pipe structure.

2. Discussion of the Background

The complexity of tubular structures (also referred to herein as pipe structures) that are used as umbilicals, risers, flow lines, or offload lines in oil and gas subsea exploration is increasing to satisfy growing requirements in thermal behavior, geometry, multiple fluid flows, flexibility and mechanical characteristics. Some of the configurations for such structures include pipe-in-pipe, insulated pipe and multiple pipe bundles. Such pipe structures may be used to connect wells or facilities at the sea bed to floating facilities and the like at the sea surface. Unfortunately, such pipe structures are subject to structural failure due to fatigue, corrosion, erosion, or blockage which can be caused by the interior deposition of one or more of the flow components (such as wax, hydrates, scales, asphaltenes, etc.). Accordingly, there is a need to monitor the condition of such pipe structures so that remedial measures may be taken before such structural failure occurs.

SUMMARY OF THE INVENTION

The applicants have observed that a frequent precursor to the structural failure of such pipe structures is the invasion of an annular space in such a structure by an unwanted fluid, such as seawater. Accordingly, the above and other needs and problems are addressed by the present invention, which provides a novel system and method for detection of fluid invasion in an annular space of a flexible pipe structure. In an exemplary embodiment, a thermal element and a temperature sensing element are placed in the vicinity of each other and in the annular space of a flexible pipe structure being monitored. The temperature sensing element is connected to a monitoring system. The thermal element generates a thermal signal within the fluid medium contained with the annular space. The temperature sensing element is placed close enough to the thermal element to obtain a measureable thermal response from the fluid medium, typically in the range of about 0 to 20 mm (e.g., wherein this range can vary based on the configuration of the system and for a given application). The monitoring system processes the response of the temperature sensing element to the thermal signal to detect whether invasion of the annular space by an unwanted fluid, such as seawater, has occurred.

The generation of a localized thermal signal in the annular space advantageously creates a new baseline for determining the response of the temperature sensing element to the fluids contained in the annular space, thereby eliminating noise in the response caused by changing ambient temperatures in the ocean or other body of water surrounding the sensing element. When the temperature sensing element is an optical fiber, and the monitoring system is a distributed temperature sensor (DTS) based on Raman or Brillouin or Rayleigh scattering, the temperature or temperature variation of the fiber may be measured along its whole length on a temperature-per-meter basis in real time, thus allowing the system operator to determine the location of the unwanted fluid invasion along the length of the pipe structure.

Still other aspects, features, and advantages of the present invention are readily apparent from the entire description thereof, including the figures, which illustrate a number of exemplary embodiments and implementations. The invention is also capable of other and different embodiments, and its several details can be modified in various respects, all without departing from the spirit and scope of the invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Various embodiments and aspects of the invention will now be described in detail with reference to the accompanying figures. Furthermore, the terminology and phraseology used herein is solely used for descriptive purposes and should not be construed as limiting in scope Language such as "including," "comprising," "having," "containing," or "involving," and variations thereof, is intended to be broad and encompass the subject matter listed thereafter, equivalents, and additional subject matter not recited. Further, whenever a composition, a group of elements or any other expression is preceded by the transitional phrase "comprising", "including" or "containing", it is understood that it is also contemplated the same composition, the group of elements or any other expression with transitional phrases "consisting essentially of", "consisting", or "selected from the group of consisting of", preceding the recitation of the composition, the elements or any other expression.

The term "system" may also be referred to herein as "apparatus".

The present invention includes recognition that flexible pipe structures are used as umbilicals or risers or flow lines or offload lines or other subsea applications. Although flexibility of such structures helps to reduce stresses due to movement, they are susceptible to deterioration and/or rupture during transport, deployment and/or operation. They also can experience flow assurance problems. Accordingly, the present invention provides a system and method for detection of fluid invasion in an annular space of a flexible pipe structure. The structures which can be the subject of this invention can include any suitable structures, wherein detection of leaks is needed, such as any subsea pipe, subsea structure, e.g., a flexible pipe, such as a flexible riser or an umbilical. Such structures are known in the art, see, e.g., U.S. Pat. Nos. 7,296,480 and 5,918,641, incorporated herein by reference.

Figure 1:
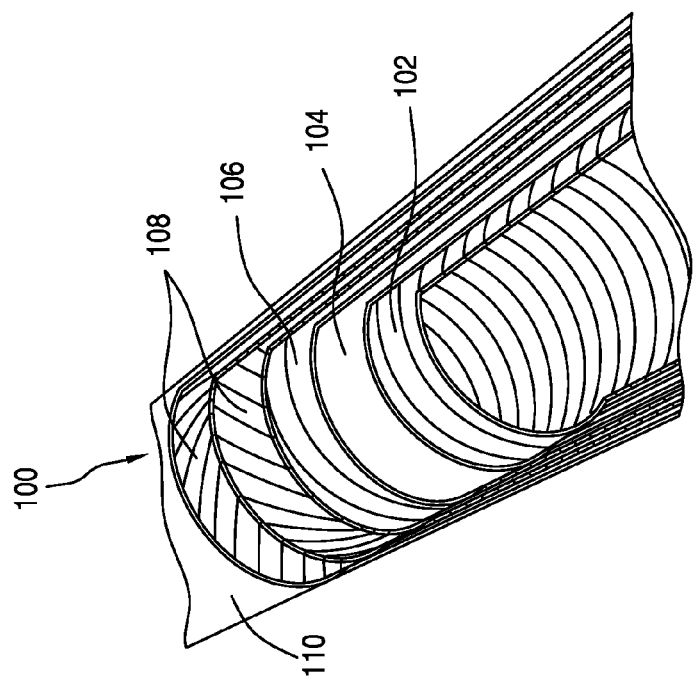
FIG. 1 is an exemplary structure in the form of a flexible pipe, such as a pipe that can be used for subsea oil and gas exploration.

Referring now to the drawings, wherein like reference numerals designate identical or corresponding parts throughout the several views, and more particularly to FIG. 1 thereof, there is illustrated a typical composition of a flexible pipe. The layers and their respective functions and characteristics are described below and are further described in ECNDT 2006—Poster 106, "Flexible Line Inspection," Ricardo DE OLIVEIRA CARNEVAL, Mauro Gonçalves MARINHO, Joilson M. dos Santos, PETROBRAS, Macaé, Brazil; and Mauro G. Marinho, Caudio S. Camerini, Sergio R. Morikawa, Daniel R. Pipa, Gustavo P. Pires, João M. Santos, Agildo B. Moreira, "NEW TECHNIQUES FOR INTEGRITY MANAGEMENT OF FLEXIBLE RISER-END FITTING CONNECTION," Proceedings of the ASME 27th International Conference on Offshore Mechanics and Arctic Engineering, OMAE2008, Jun. 15-20, 2008, Estoril, Portugal, OMAE2008-57929.

In FIG. 1, the flexible pipe 100 includes an interlocked steel carcass 102 that is resistant to hydrostatic pressure and to radial compression during installation, and which supports an inner thermoplastic sheath 104. The carcass 102 is generally manufactured with stainless steel (e.g., AISI 304 or 316). The inner thermoplastic sheath 104 promotes sealing, prevents internal fluids (e.g., oil, gas or water) from permeating to the external layers. The inner thermoplastic sheath 104 is manufactured with nylon or a similar material. An interlocked steel pressure layer 106 is provided, which is configured to resist internal and hydrostatic pressure and radial compression. The pressure layer 106 is usually manufactured with carbon steel or similar material. Double cross-wound tensile armors 108 (which may also be referred to as "armor layer") are configured to resist axial forces, internal pressure and torsion. An external thermoplastic sheath 110 protects the internal layers against external agents, such as corrosion and abrasion, and maintains the double cross-wound tensile armors 108 together, and assures sealing of the flexible pipe structure. The sheath 104 is usually manufactured with a polymer, such as nylon, and the like.

Figure 2:
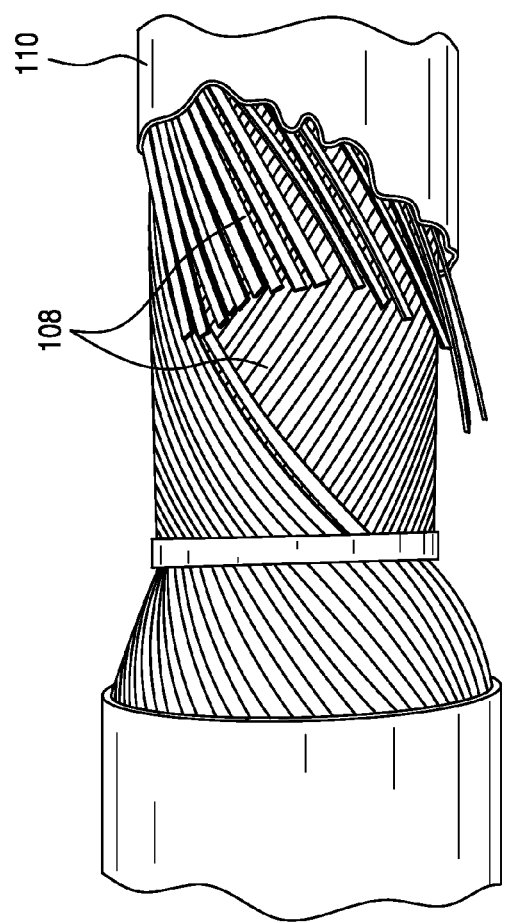
FIG. 2 illustrates armor wire rupture caused by fatigue at the interface tube/end fitting of the flexible pipe structure of FIG. 1.

Studies with respect to the inspection and maintenance of flexible pipes indicate that the major causes of failure include: (1) rupture of the armor wire layer 108 caused by fatigue at the interface tube/end fitting, as shown in FIG. 2; (2) sealing failure of the inner sheath 104 due to degradation; (3) dislocation inside of the end fitting; (4) corrosion of the armor wire layer 108 and carcass 102; and (5) torsional instability. Most of the common failure modes are aggravated by the presence of fluids in the annular space (e.g., between the inner sheath 104 and the outer sheath 110) of the flexible pipe 100. Sea water invasion of this annular space can promote corrosion of the metal elements and result in failures of the flexible pipe structure. Accordingly, the present invention provides a system and method for monitoring and detection of fluid invasion in the annular space of a pipe structure, such as a flexible pipe 100 or riser structure, and the like.

Figure 3:
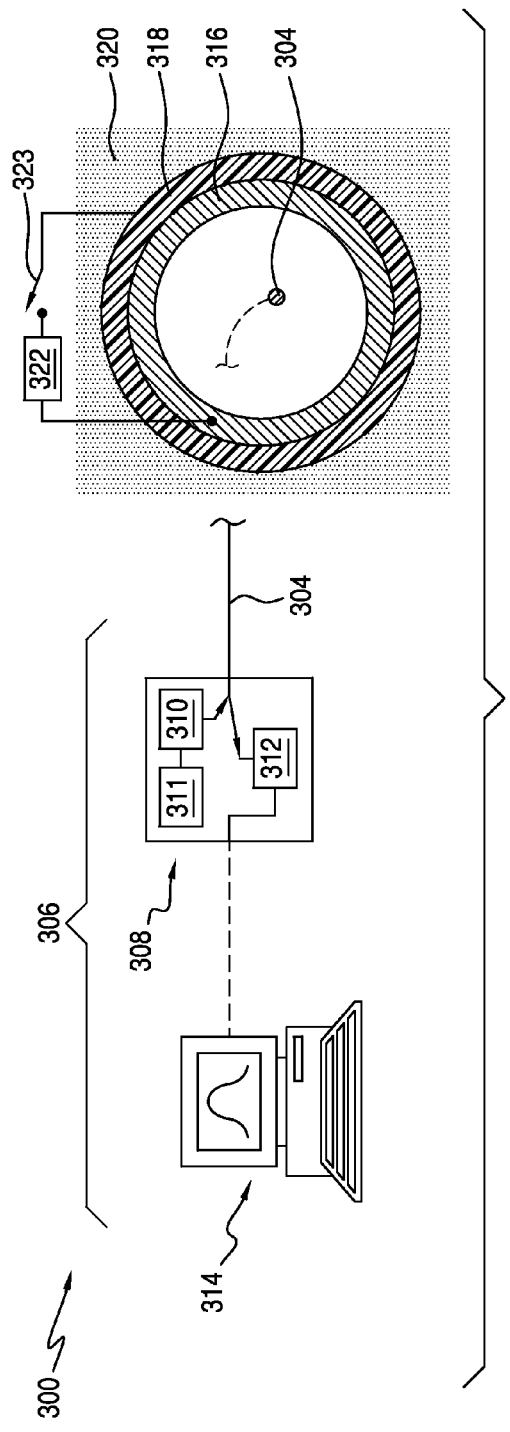
FIG. 3 illustrates an exemplary system for monitoring and detection of fluid (e.g., water, oil or gas) invasion in an annular space of a pipe structure.

FIG. 3 illustrates an exemplary system 300 for monitoring and detection of fluid invasion in the annular space of a pipe structure. The exemplary system 300 includes a temperature sensing element in the form of an optical fiber 304 that is connected to a monitoring system 306. The monitoring system 306 includes an optical signal generator 308 having a laser light source 310 that transmits laser light into the fiber 304, a timing circuit that actuates the laser light source 310 to produce pulses of laser light, and a photodetection circuit 312 that converts the pulses of laser light that are reflected by the fiber 304 into an electrical signal. The monitoring system 306 further includes a digital processor 314 that receives and processes the electrical signals generated by the photodetection circuit 312 into temperatures throughout the length of the optical fiber 304.

Such a monitoring system 306 may be, for example, a "Wellwatcher Ultra Distributed Temperature System" available from Services Techniques Schlumberger Le Palatin 1, 1 Cour du Triangle, 92936 La Defense, Cedex, France. Such a system 306 measures temperature along the whole length of the optical fiber 304 on a temperature per meter basis in real time via the known technique of "Distributed Temperature Sensing", or DTS based on Raman or Brillouin or Rayleigh scattering. In this temperature measurement technique, laser light source 310 injects pulses of laser light into the optical fiber 304 having a selected amplitude and time duration. Some of the light is reflected back through the length of the fiber 304 due to backscattering. The parameters of molecular vibration, which is directly related to temperature, creates differences in the backscattered light as the light pulse passes through the optical fiber. The backscattered light is detected by the photodetection circuit 312 and is converted to values of temperature at one meter intervals along the whole length of the fiber 304 by way of Optical Time Domain Reflectometry (OTDR). The operating principle for OTDR is very similar to the "time of flight" measurement used for radar. From the time it takes the backscattered light to return to the photodetection circuit 312 it is possible to locate the location of the temperature event. Hence a principal advantage of using a DTS-based monitoring system 306 in the system of the invention is that it can detect not only when fluid invasion has occurred, but also the location of the fluid invasion along the length of the pipe structure 100.

The system 300 further includes a thermal element in the form of a tube 316 that is covered with a protective layer 318 and that is placed in the annular space 320 of a flexible pipe or other structure. The tube 316 can be made out of an electrically conducting material, such as metal, so that an electrical current can conducted through the walls thereof in order to generate heat as a result of the inherent resistance of the conductive material. The term "electrically conductive material" may also be referred to herein as a conductor material. The protective layer 318 can be used as an electrical insulator to prevent current leaks to the rest of the environment. The optical fiber 304 can be placed in the tube 316, for example, by pumping a fluid therethrough to create a pressure differential that pulls the fiber 304 through the tube 316. While the tube 316 can be a metal thermal element made from steel, stainless steel, or corrosion resistant alloys such as Incoloy or Inconel, and the like, the tube 316 can also be a composite thermal element, such as made from carbon fiber in resin composites. In this preferred embodiment of the system 300, the thermal element is a stainless steel tube 316 approximately 0.125 inches in diameter covered by a layer 318 made from nylon or polypropylene. Such a tube is advantageously flexible, corrosion resistant, and sufficiently electrically resistant to generate measurable heat when an electrical current is conducted therethrough. The tube 316 is connected at either end to a source of electrical current 322 via wires as shown in FIG. 4. A switch 323 controls the amount of electrical current applied through the tube 316 to heat the same.

In further exemplary embodiments, a thermal signal in the form of a heating pulse can be introduced into the annular space 320 by applying a controlled amount of electrical current through the tube 316 via switch 323, and the resulting changes in the temperature of the annular space 320 can be monitored by the monitoring system 306 for example, in terms of amplitude, delay time, time constant, signal shape, a combination thereof, and the like, based on any other suitable signal processing methods, for example, embodying a match to a physical thermal model varying in space and time, and the like. The thermal signal introduced by the thermal element can either be continuous, step, periodic, sinusoidal, triangular, saw tooth, pulse, pulse burst, or any other suitable signal or combination of signals suited to the application, and the like. The interpretation of the resulting temperature signal produced by the temperature sensing element can depend on the signal applied to the thermal element and can employ thermodynamic modeling of the system, rise time, fall time, delay time, pulse width, signal phase, signal amplitude, frequency analysis, correlation, cross-correlation, and other suitable techniques, and the like.

In place of or in combination with electrical energy, hot or cold fluids can be pumped into the tube 316, as needed, to generate a time-varying thermal signal that results in an initial increase or decline in temperature over time. In addition or instead of using the hot or cold fluids, the tube 316 can be configured to include an electrical heater in either its interior or exterior as explained in more detail hereinafter. Further, although the optical fiber 304 is placed inside of the tube 316, in further exemplary embodiments, a thermal element can be placed inside of a sensing element. Moreover, the optical fiber 304 and the thermal element 316 can be incorporated into a flexible pipe or other structure, during manufacturing or commissioning thereof, and the flexible pipe or structure can be located under the surface of water or ground.

In lieu of an optical fiber 304, the temperature sensor can also be a single point sensor, an array of sensors, a distributed sensor, and the like. However, optical fiber sensors are particularly well suited for this application. While the use of optical fibers as Distributed Temperature Sensors (DTS) based on Raman or Brillouin scattering has been described, Fiber Bragg Grating (FBG), Rayleigh Scattering sensing (RSS), based temperature sensors can also be used, as well as interferometric sensors, and the like. The temperature sensor does not have to be optically based, and may also be a thermocouple. If distributed or multiple sensors are used, the location of the fluid invasion along the length of the flexible pipe 100 can be obtained from the corresponding signals.

Figure 4A:
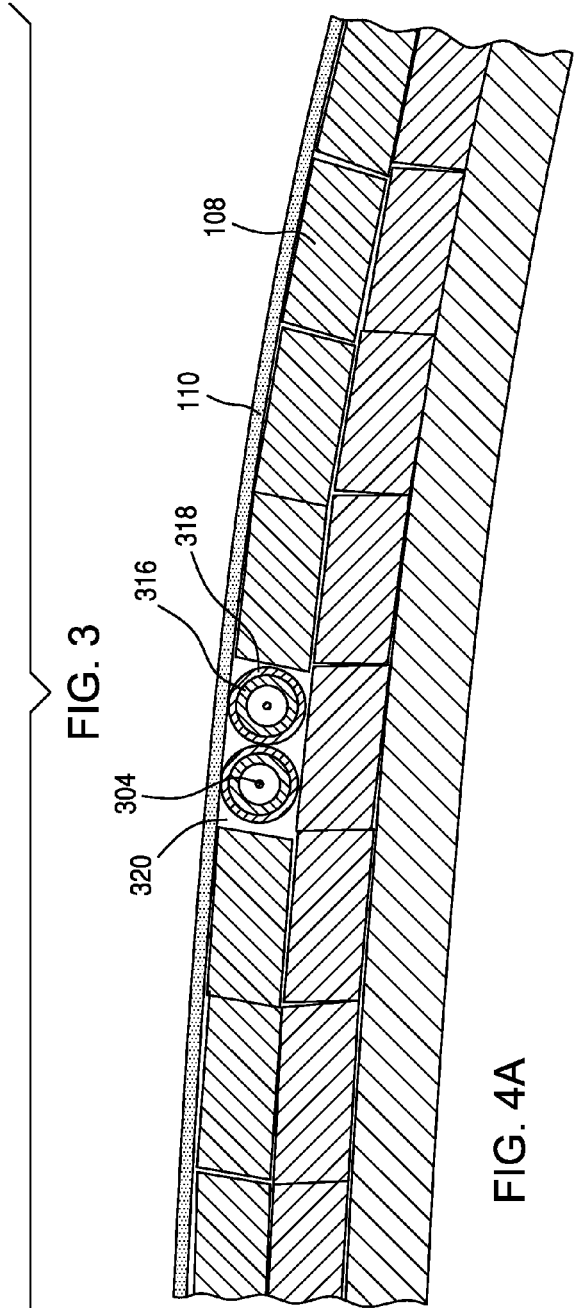
FIG. 4A illustrates an exemplary monitoring and detection system arrangement showing a cross sectional view where one of the strength strands under an outer sheath of a flexible pipe is replaced with the monitoring and detection system illustrated in FIG. 3.

FIG. 4A illustrates how the temperature sensing element and thermal element of the monitoring and detection system 300 might be installed in the annular space 320 of flexible pipe 100 illustrated in FIG. 1. FIG. 4 shows a cross sectional view of the flexible pipe 100 where one of the strength strands of the outer tensile armor 108 located immediately under the outer sheath 110 has been removed and replaced with a tube 316 that has been "doubled up" and connected together to form a loop to more completely fill the space and to increase the sensitivity of the system 300. The doubled-up tube 316 contains an optical fiber 304 that senses temperature, and is surrounded by a protective layer 318 as shown. Wires connect opposite ends of the tube 316 to a current source 322 capable of providing a sufficiently powerful pulse of current to generate a thermal signal in the annular space 320. The optical fiber 304 is connected to the monitoring system 306 shown in FIG. 3. In FIG. 4, the annular space 320 where the doubled-up tube 316 of the system 300 is positioned is the area where the flexible pipe 100 is most likely to be invaded by unwanted fluids.

Figure 4B:
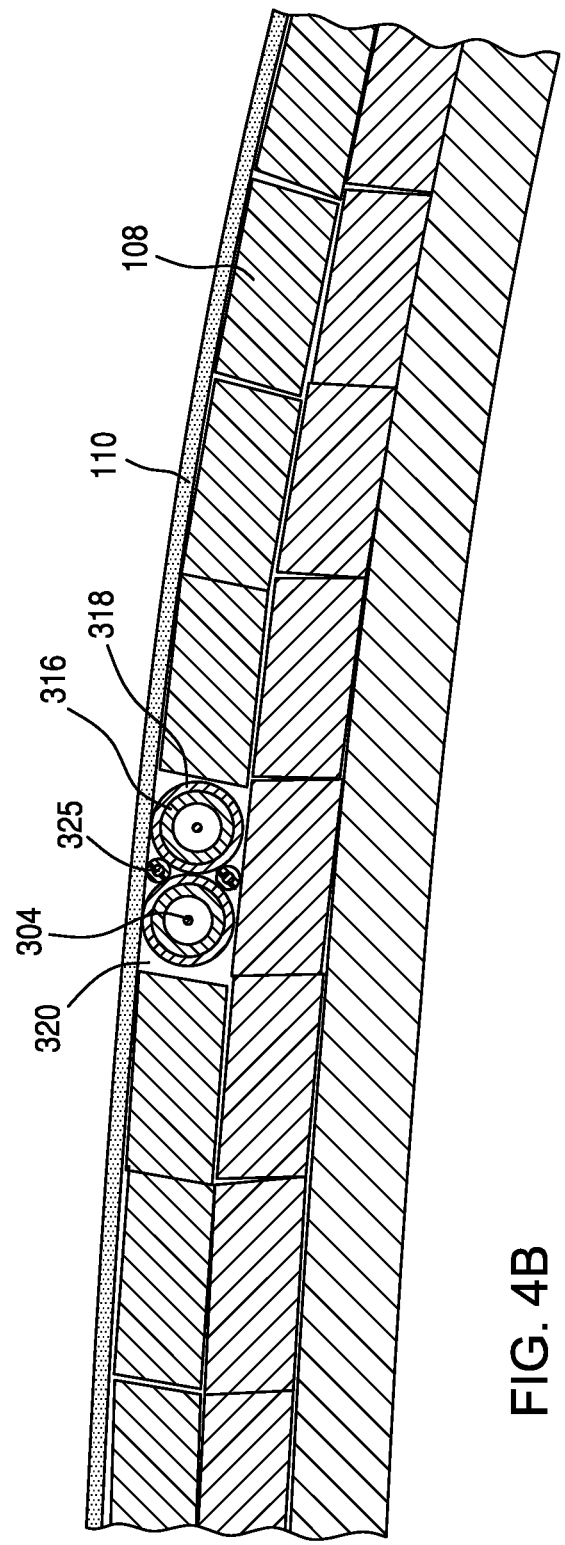
FIG. 4B illustrates an alternative monitoring and detection system arrangement installed in a flexible pipe in the same manner as illustrated in FIG. 4A.

FIG. 4B illustrates an alternative embodiment of the monitoring and detection system 300 in which a differently-structured thermal element. Like the previously described embodiment of FIG. 4A, one of the strength strands of the outer tensile armor 108 of the flexible pipe 100 has been removed and replaced with a tube 316 that has been "doubled up" and connected together to form a loop. FIG. 4 shows a cross sectional view of the flexible pipe 100 where one of the strength The doubled-up tube 316 contains an optical fiber 304 that senses temperature, and is surrounded by a protective layer 318 as shown. However, instead of using the pipe 316 itself as a resistive element to generate a thermal signal, separate electrical-resistance heating elements 325 are applied over the exterior of the pie 316 as shown. The optical fiber 304 is connected to the monitoring system 306 shown in FIG. 3. In operation, an electrical current is applied to opposite ends of the heating elements to generate a thermal signal in the annular space 320.

Figure 5:
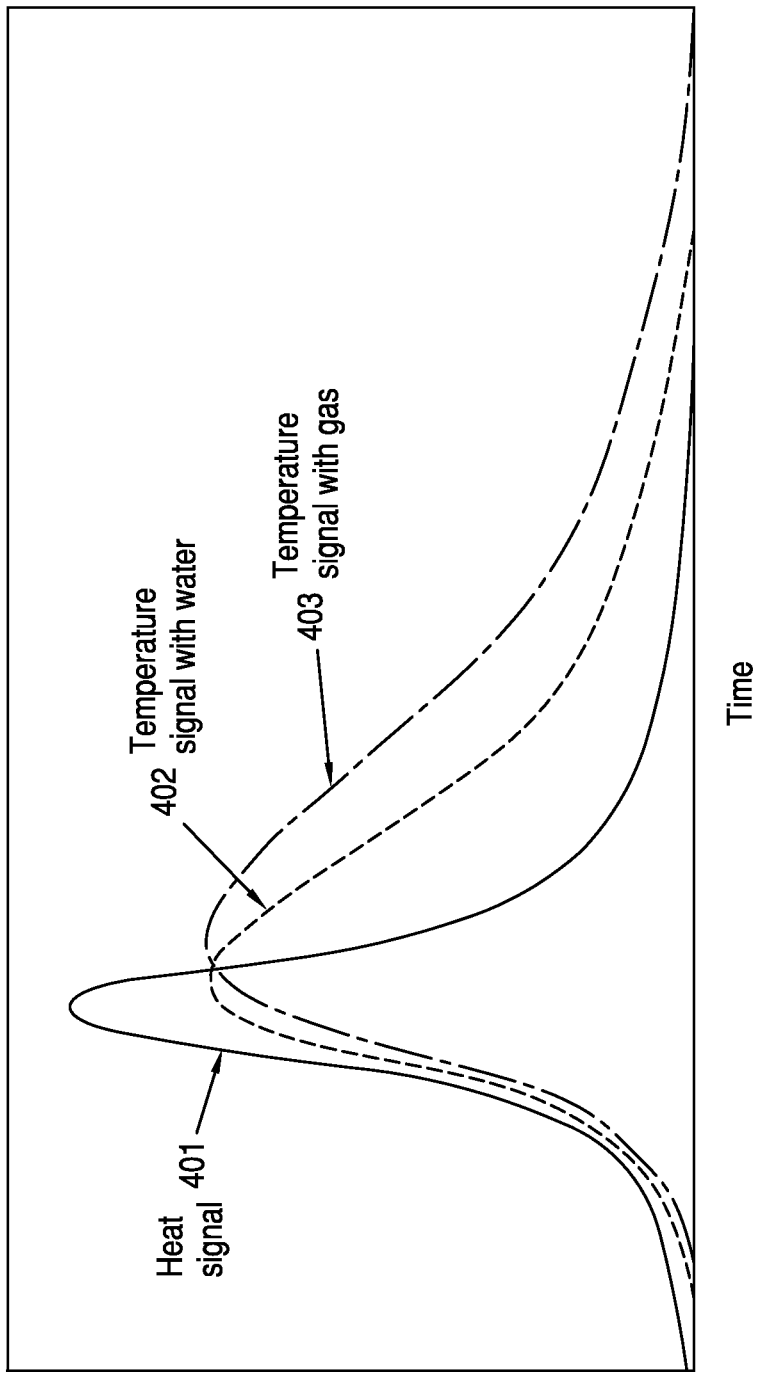
FIG. 5 illustrates a graph showing expected heat and temperature signals versus time for the exemplary systems of FIGS. 3-4.

In FIGS. 3-4B, an exemplary method of detecting fluid invasion of a flexible pipe annular space includes using a thermal element such as the pipe 316 or heating elements 325 to heat the region in an annulus, such as the annulus 320, in the vicinity of a temperature sensing element, e.g., the temperature optical fiber 304, and monitoring the temperature at the same location with the temperature sensing element, to determine if that region is filled with gas or liquid. This is illustrated in the graph shown in FIG. 5 showing heat and temperature signals versus time for the exemplary system of the invention shown in FIGS. 3-4. In FIG. 5, a thermal signal 401 is introduced by the pipe 316 into the annular space 320 by conducting a pulse of electrical current through the pipe 316. The resulting expected temperatures over time are monitored by the combination of the optical fiber 304 and monitoring system 306 are indicated by curves 402 and 403. Curve 402 corresponds to the expected case when water is present in the annular space 320, and curve 403 corresponds to the expected case when gas is present in the annular space 320. Accordingly, if water is filling the monitored area, e.g., annular space 320, the rise and fall in temperature are correspondingly delayed relative to the signal 401, as shown by the curve 403. However, the shape of the curve 403 will depend on the type of fluid at the vicinity of the optical fiber 304 and the thermal element 316. The delay will be greater if water is occupying the monitored area, e.g., the annular space 320, than if gas is occupying the monitored area, e.g., the annular space 320, as shown by the curves 402 and 403. Without wishing to be bound by a theory of operability, this is due to a combination of factors such as the thermal conductivity and the higher specific heat capacity of liquid water than gas (e.g., ~4 times higher). Accordingly, by applying the heat signal 401 by the thermal element 316 and measuring the resulting temperature changes over time, monitoring and detection of fluid (e.g., oil, gas or water) invasion in the annular space of a pipe structure, such as a flexible pipe or riser structure, and the like, can be accomplished. In an exemplary embodiment, a "heat signal" can be like a "theoretical heat signal" or "input theoretical heat signal," wherein it is in different units, for example, energy rather than temperature units. Generally, the peak amplitude of the corresponding "temperature signal with gas" and the corresponding "temperature signal with water" can be different, and the shape of the resulting decay curve may also be different.

Figure 6:
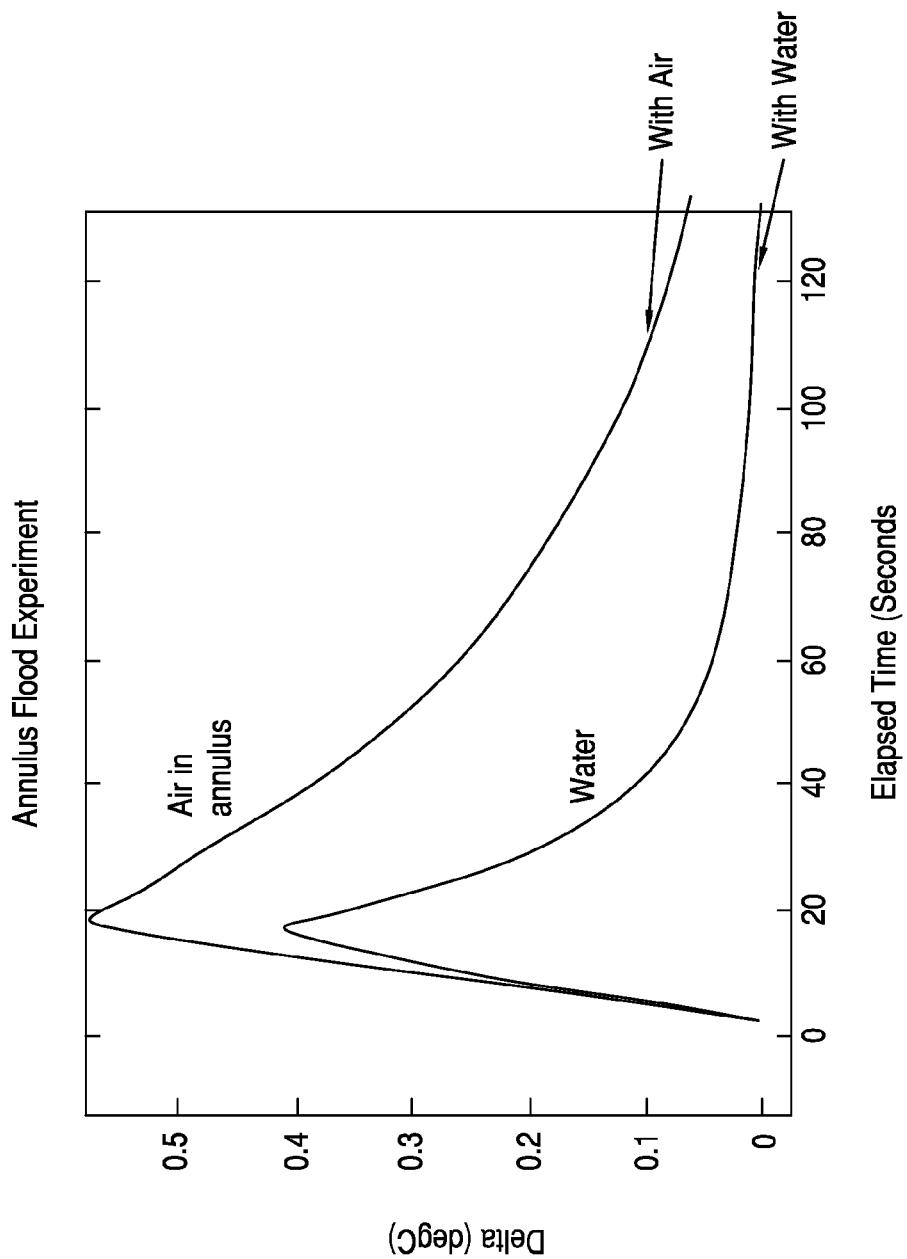
FIG. 6 illustrates experimentally obtained temperature vs. time graphs for a pipe annulus filled with water vs. the same annulus filled with air.

FIG. 6 illustrates the graphs obtained from an actual experimental test of the system 300. In this test, a stainless steel tube 0.124 inches in diameter was subjected to a pulse of electrical current in order to generate a thermal signal. The tube contained a temperature sensing element in the form of a platinum thermocouple, i.e. a p100 sensor. In one test, the tube was surrounded with air; in a second test, the tube was surrounded with water. The test confirmed that the shapes of the resulting temperature/time curves were substantially different. Note in particular the relatively rapid drop off in measured temperature in the curve labeled "water" vs. the curve labeled "air". Thus the test confirms the expected shapes of the curves in FIG. 5, and hence the operability of the invention.

Although the exemplary embodiments are described in terms of use of the exemplary system and method of the invention in the context of an annular space of a pipe structure, such as flexible pipes or risers, the exemplary embodiments can be applied to any suitable structures, such pipes, pipes in pipes, integrated production bundles, offloading pipes, jumpers, risers, umbilicals, Christmas trees, flexible pipes, manifolds, control units, well heads, pieces of subsea equipment, and the like, as will be appreciated by those skilled in the relevant art(s). More generally, the exemplary embodiments can be applied to any suitable structures comprising a first barrier to a first fluid and a second barrier to a second fluid, the first barrier and the second barrier defining a space therebetween, and placing in that space the exemplary system of this invention for monitoring and detection of fluid (e.g., water, oil or gas) invasion therein, as described in to FIGS. 3-5, as will be appreciated by those skilled in the relevant art(s).

While the inventions have been described in connection with a number of exemplary embodiments, and implementations, the inventions are not so limited, but rather cover various modifications, and equivalent arrangements, which fall within the purview of the appended claims.

What is claimed is:

1. A system for monitoring and detecting fluid invasion of a space between inner and outer sheaths of a flexible pipe, the system comprising:
   a thermal element positioned in the space between the inner and outer sheaths that generates a thermal signal within the space;
   a temperature sensing element positioned in the space between the inner and outer sheaths that senses a thermal variation caused by the thermal signal in the fluid outside the thermal element in the space; and
   a monitoring system connected to the temperature sensing element that processes the thermal variation to determine the presence of a fluid in the space between the inner and outer sheaths.

2. The system of claim 1, wherein the thermal element is configured for at least one of heating and cooling.

3. The system of claim 1, wherein the presence of a given fluid is indicative of fluid invasion of the space between the inner and outer sheaths.

4. The system of claim 1, wherein the thermal element is a tube having walls.

5. The system of claim 1, wherein the temperature sensing element is placed inside the thermal element or the thermal element is placed inside the temperature sensing element.

6. The system of claim 1, wherein the temperature sensing element is placed side by side the thermal element.

7. The system of claim 1, wherein the determination of whether fluid invasion has occurred in the space between the inner and outer sheaths includes using the thermal element to heat or cool a region in the vicinity of the temperature sensing element and monitoring changes in the temperature to determine if the region is filled with the fluid.

8. The system of claim 7, wherein said thermal signal generated by the thermal element is characterized by a change in temperature over time.

9. The system of claim 8, wherein said thermal signal generated by the thermal element is characterized by an initial increase in temperature over time.

10. The system of claim 3, wherein the monitoring system employs one of thermodynamic modeling of the system, rise time of the monitored temperature, fall time of the monitored temperature, delay time of the monitored temperature, pulse width of the signal, signal phase of the signal, signal amplitude of the signal, frequency analysis of the monitored temperature, correlation of the monitored temperature, and cross-correlation of the monitored temperature.

11. The system of claim 4, wherein the thermal element generates said thermal signal by one of being heated by an electrical current or conducting a hot or cold fluid.

12. The system of claim 1, wherein the thermal element comprises one or more thermal elements that are heated by an electrical current.

13. The system of claim 12 wherein the thermal elements are connected in a loop.

14. The system of claim 4, wherein the temperature sensing element is placed in the thermal element.

15. A method for detecting fluid invasion of an annular space between an inner and outer sheaths of a flexible pipe structure, comprising:
   placing a thermal element and a temperature sensing element in an annular space of the pipe structure in the vicinity of one another;
   generating a thermal signal from the thermal element within the annular space, wherein the thermal element is a tube having walls, wherein the thermal signal is generated by pumping one of hot and cold fluids into the tube or by passing an electrical current through walls of the tube;
   sensing the thermal signal by the temperature sensing element; and
   monitoring and processing said thermal signal to detect fluid invasion of the annular space of the pipe structure.

16. The method of claim 15, wherein the pipe structure is a flexible pipe and further including the step of incorporating the sensing element and the thermal element into the flexible pipe during manufacturing or commissioning thereof.

17. The method of claim 15, wherein the determination of the fluid invasion of the annular space includes using the thermal element to heat a region in the annular space in the vicinity of the temperature sensing element and monitoring the temperature to determine if the region is filled with the fluid.

18. The method of claim 15, wherein the thermal signal is a heating or cooling signal or transient pulse.

19. The method of claim 15, wherein the detection of the fluid invasion of the annular space of the pipe structure includes employing one of thermodynamic modeling, rise time of the monitored temperature, fall time of the monitored temperature, delay time of the monitored temperature, pulse width of the signal, signal phase of the signal, signal amplitude of the signal, frequency analysis of the monitored temperature, correlation of the monitored temperature, and cross-correlation of the monitored temperature.

20. The method of claim 15, wherein the temperature sensing element is placed in the tube by creating a pressure drop that pulls the temperature sensing element into the thermal element.

21. The method of claim 15, wherein the monitoring and processing includes the storing of a baseline data set to be used as reference for the subsequent temperature variation evaluation or interpretation.

22. The method of claim 15, wherein the thermal signal is characterized by a change in temperature over time.

23. The method of claim 15, further comprising:
sensing the thermal signal by the temperature sensing element disposed in the annular space.

24. The method of claim 23, wherein the sensor is disposed within the thermal element.

25. The method of claim 22, wherein a change in temperature over time is indicative of fluid invasion in the annuilar space.

26. A flexible pipe system comprising:
inner and outer layers, a space formed between the inner and outer layers;
a thermal element positioned in the space between the inner and outer layers, the thermal element adapted to generate a thermal signal within the space;
a sensor positioned in the space between the inner and outer layers, the sensor adapted to measure thermal variation caused by the thermal signal in a fluid outside the thermal element in the space; and
a monitoring system connected to the sensor adapted to process the thermal variation to determine fluid invasion in the space between the inner and outer layers.

27. The flexible pipe system of claim 26, further comprising a sensor carrier positioned in the space between the inner and outer layers, wherein the sensor is positioned inside of the sensor carrier.

28. The flexible pipe system of claim 27, wherein the thermal element is positioned outside of the sensor carrier.

* * * * *